US012657158B2

(12) United States Patent
Asano

(10) Patent No.:     US 12,657,158 B2
(45) Date of Patent:        Jun. 16, 2026

(54) COMMUNICATION APPARATUS AND CONTROL METHOD

(71) Applicant: Canon Kabushiki Kaisha, Tokyo (JP)

(72) Inventor: Nao Asano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/389,998

(22) Filed: Dec. 20, 2023

(65) Prior Publication Data

US 2024/0119024 A1     Apr. 11, 2024

Related U.S. Application Data

(63) Continuation of application No. PCT/JP2022/021179, filed on May 24, 2022.

(30) Foreign Application Priority Data

Jul. 7, 2021     (JP) ................................. 2021-113139

(51) Int. Cl.
    *G06F 16/10*          (2019.01)
    *G06F 16/11*          (2019.01)
(52) U.S. Cl.
    CPC .................................. *G06F 16/122* (2019.01)
(58) Field of Classification Search
    None
    See application file for complete search history.

(56) References Cited

U.S. PATENT DOCUMENTS

| | | | | |
|---|---|---|---|---|
| 7,889,240 B2 * | 2/2011 | Hashimoto | ........ | H04N 1/32112 |
| | | | | 348/207.1 |
| 8,068,813 B2 | 11/2011 | Shimosato | | |
| 8,090,753 B2 * | 1/2012 | Takahashi | ............... | G06F 16/51 |
| | | | | 707/824 |
| 9,225,855 B2 * | 12/2015 | Hata | .................. | H04N 1/00323 |

(Continued)

FOREIGN PATENT DOCUMENTS

| | | |
|---|---|---|
| JP | 2003234868 A | 8/2003 |
| JP | 2007166577 A | 6/2007 |
| JP | 2009151403 A | 7/2009 |

(Continued)

OTHER PUBLICATIONS

International Search Report issued on Aug. 16, 2022 in PCT Appln. No. PCT/JP2022/021179.

(Continued)

*Primary Examiner* — Belix M Ortiz Ditren
(74) *Attorney, Agent, or Firm* — Venable LLP

(57)              ABSTRACT
A communication apparatus that communicates with an external apparatus, comprises an obtainment unit that obtains, from a first external apparatus, an image file and a supplementary information file related to the image file, a first management unit that stores the image file into a first area of a storage unit, a second management unit that stores the supplementary information file associated with the image file into a second area that is different from the first area, and a control unit that transmits, to a second external apparatus, the image file that has been read out from the first area, and the supplementary information file that has been read out from the second area and associated with the image file that has been read out from the second area.

11 Claims, 14 Drawing Sheets

(56)        References Cited

U.S. PATENT DOCUMENTS

2010/0295957 A1      11/2010  Larsson
2016/0188647 A1 *     6/2016  Chang ................... G06F 16/122
                                                        707/805

FOREIGN PATENT DOCUMENTS

JP          2012527801  A      11/2012
WO          2010133262  A2     11/2010

OTHER PUBLICATIONS

Japanese Office Action dated Aug. 29, 2025 in counterpart Japanese
Patent Appln. No. 2021-113139.

* cited by examiner

F I G. 2A
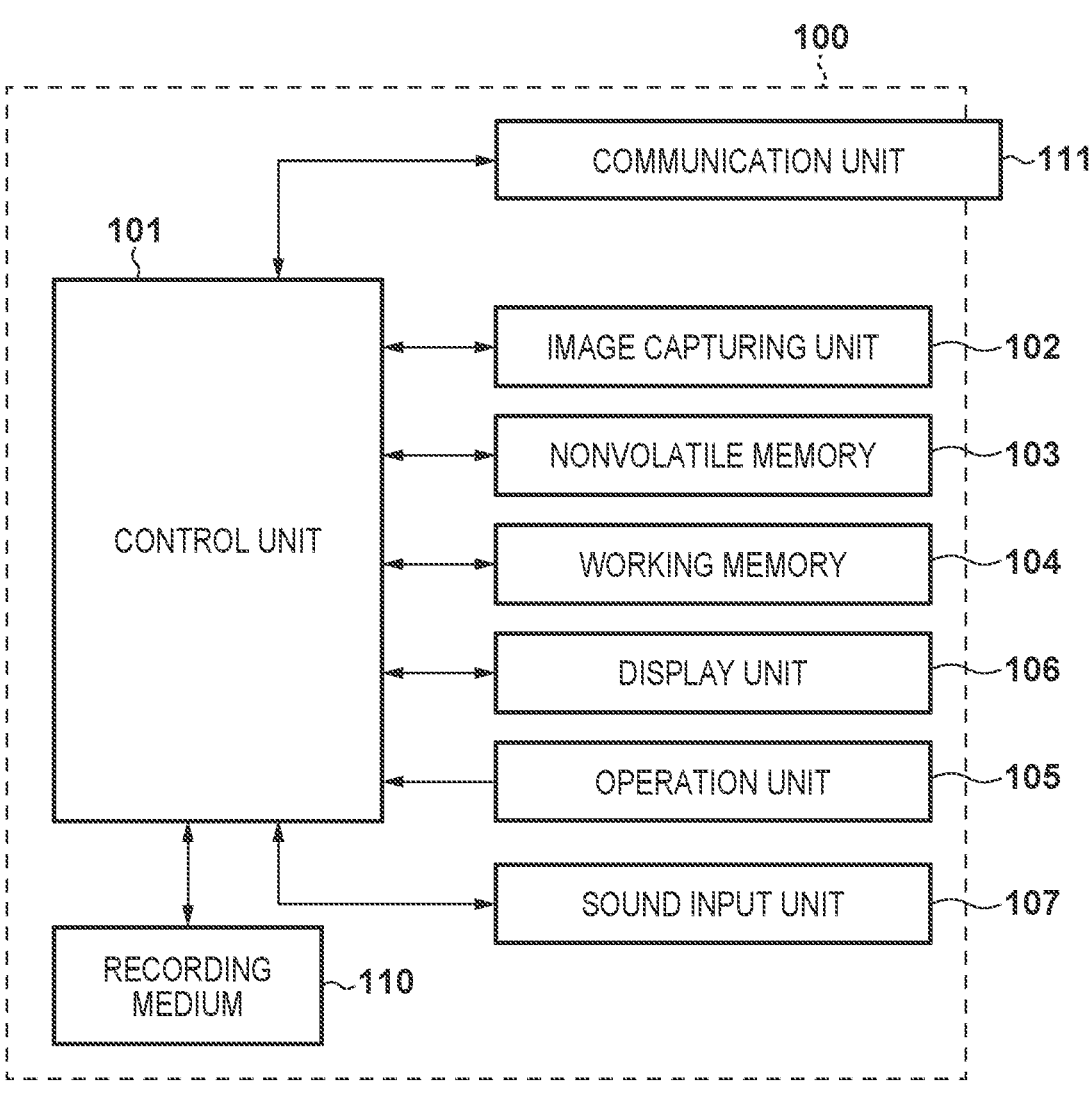

F I G. 5
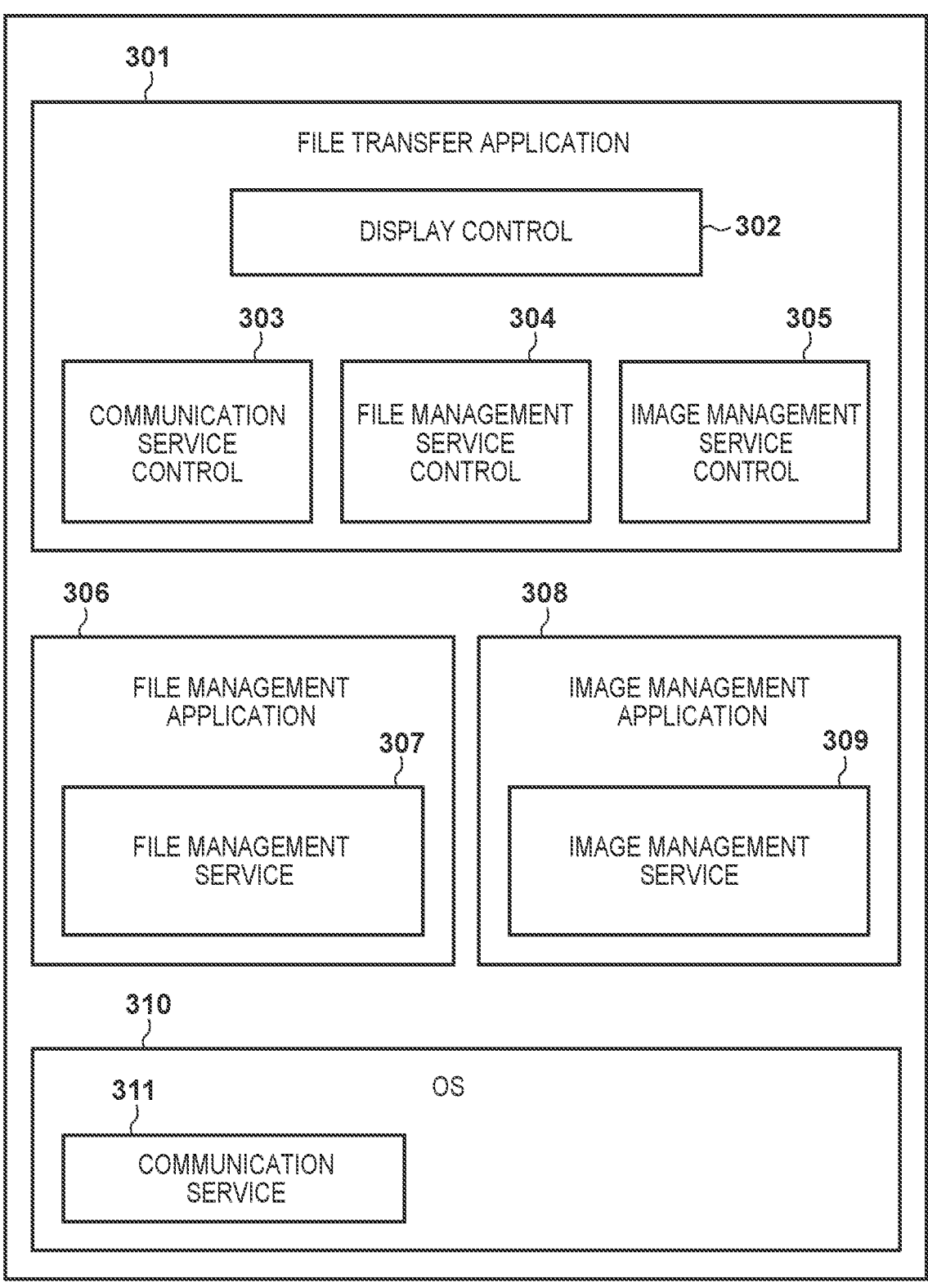

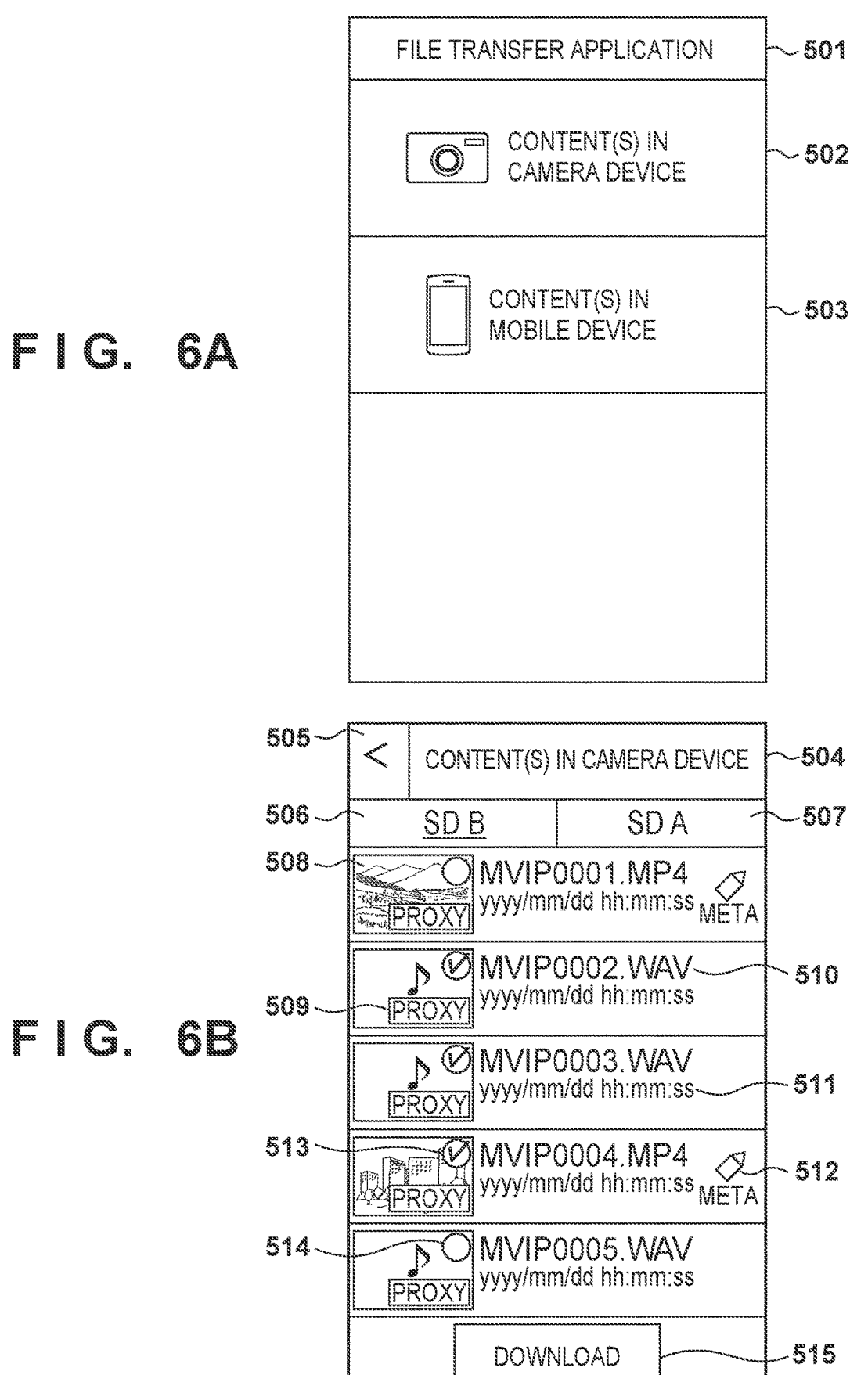
F I G.  6A
F I G.  6B

F I G.  6C
F I G.  6D
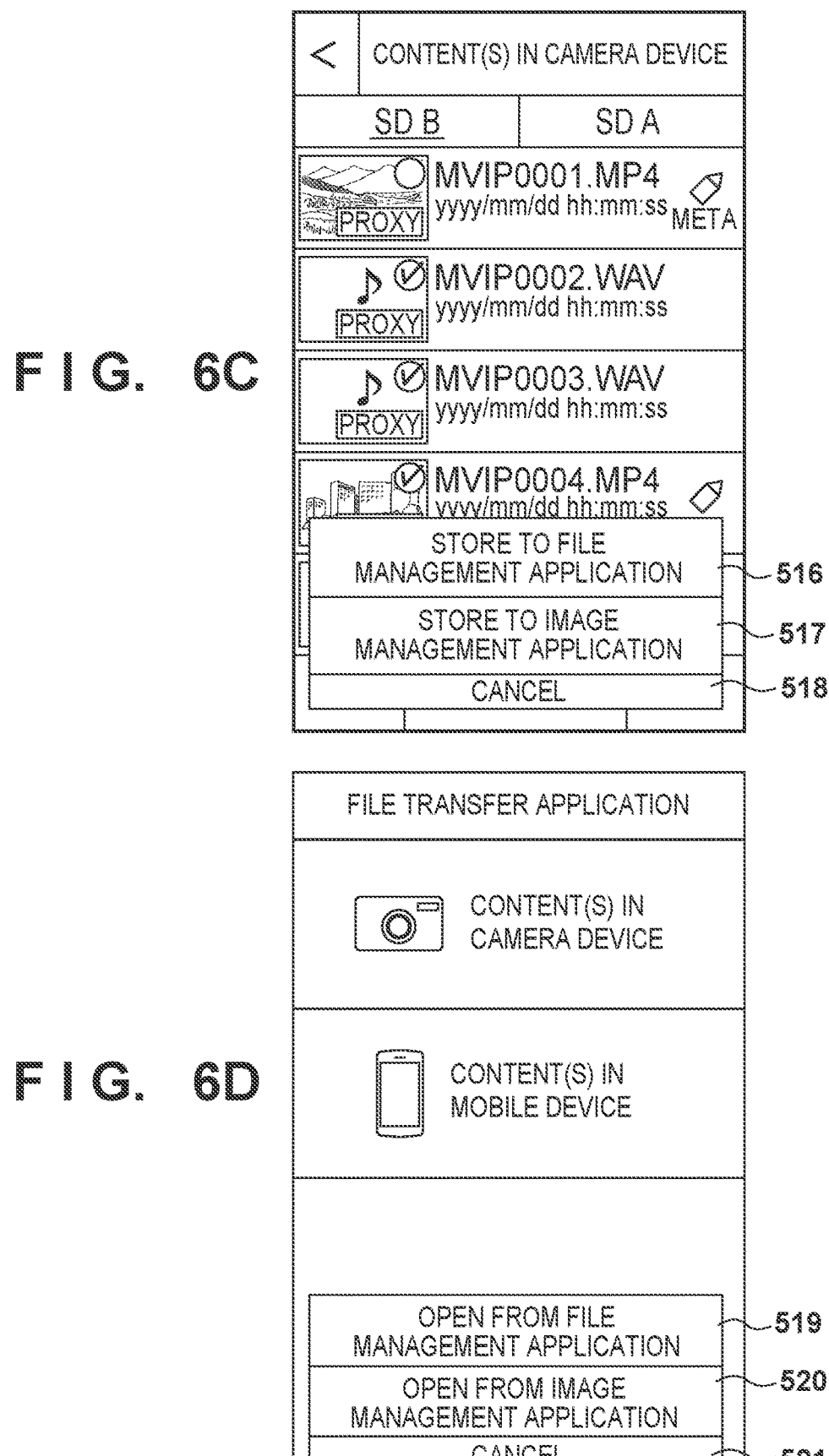

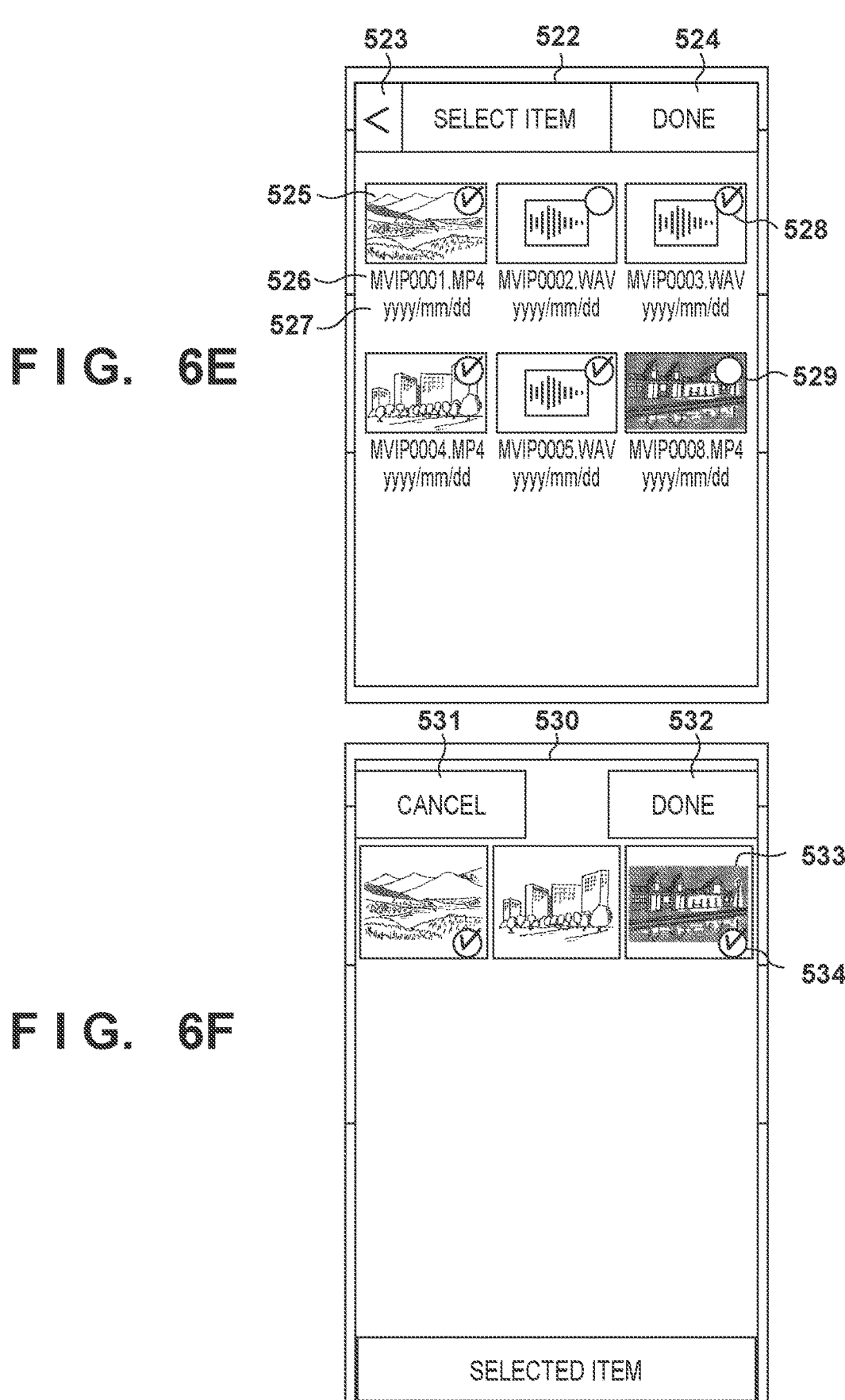
F I G.  6E
F I G.  6F

F I G.  7A
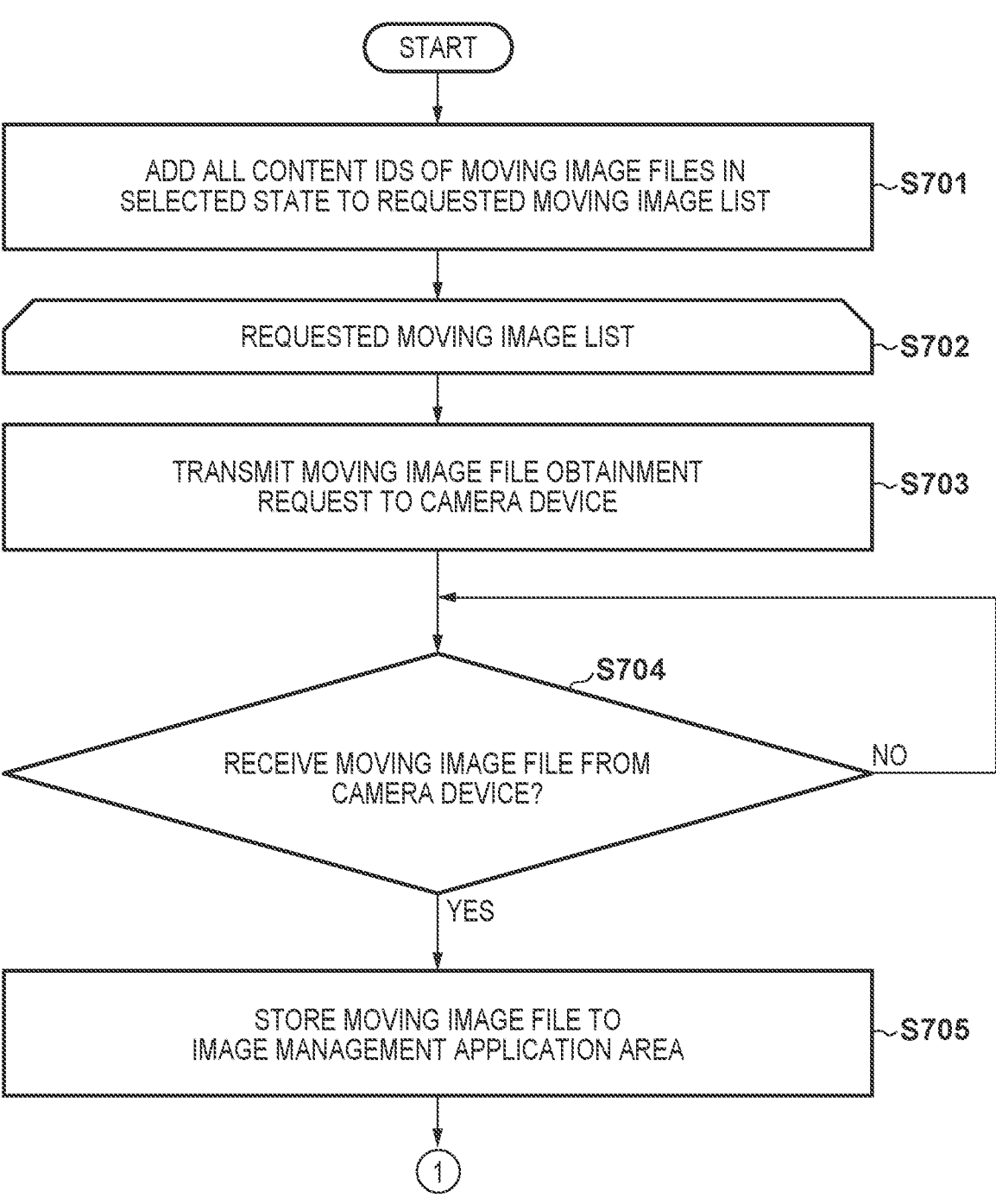
START
ADD ALL CONTENT IDS OF MOVING IMAGE FILES IN
SELECTED STATE TO REQUESTED MOVING IMAGE LIST ~S701
REQUESTED MOVING IMAGE LIST ~S702
TRANSMIT MOVING IMAGE FILE OBTAINMENT
REQUEST TO CAMERA DEVICE ~S703
RECEIVE MOVING IMAGE FILE FROM
CAMERA DEVICE? ~S704
NO
YES
STORE MOVING IMAGE FILE TO
IMAGE MANAGEMENT APPLICATION AREA ~S705
1

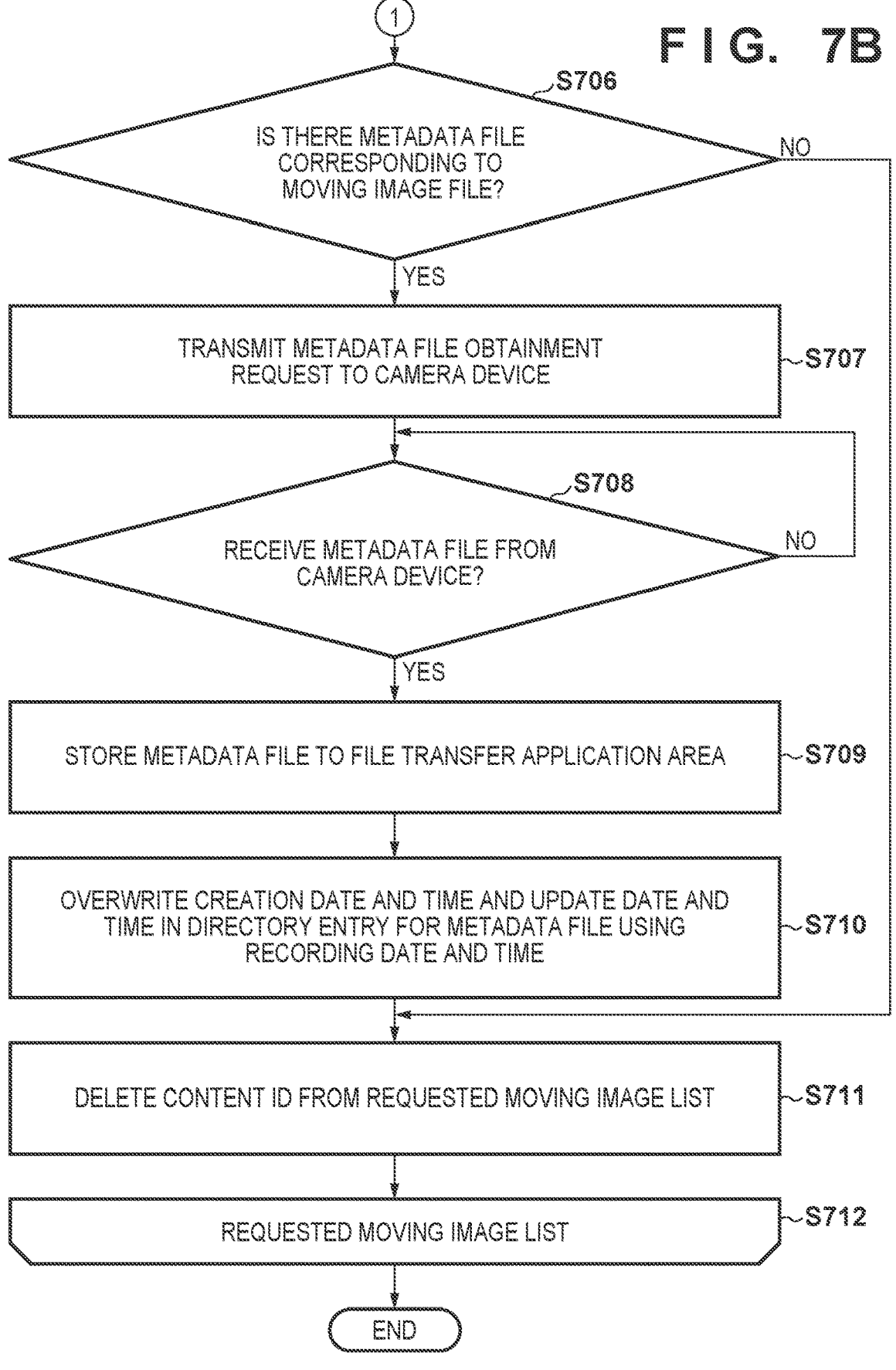
F I G.  7B

F I G. 8A

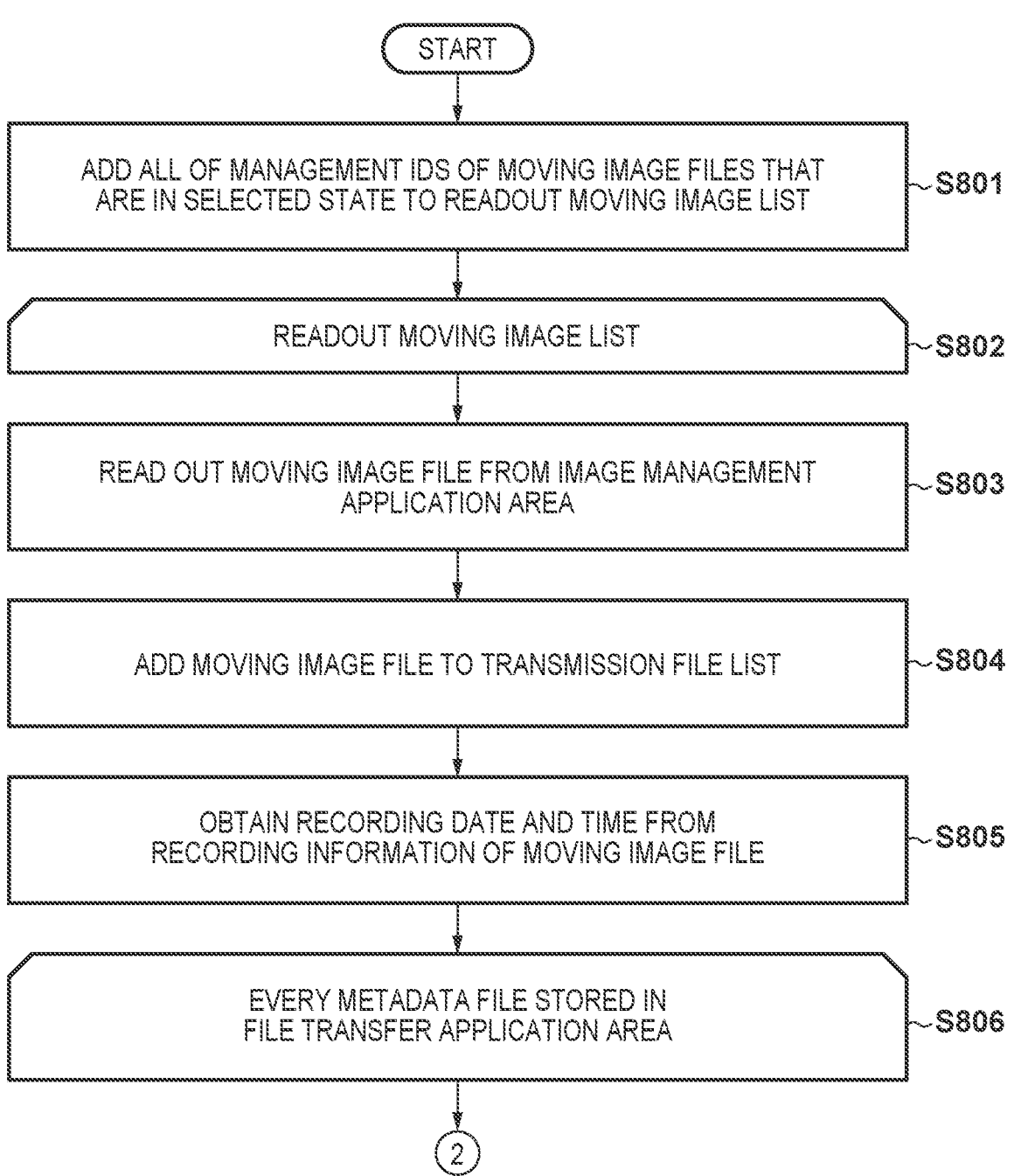

START

ADD ALL OF MANAGEMENT IDS OF MOVING IMAGE FILES THAT ARE IN SELECTED STATE TO READOUT MOVING IMAGE LIST ~S801

READOUT MOVING IMAGE LIST ~S802

READ OUT MOVING IMAGE FILE FROM IMAGE MANAGEMENT APPLICATION AREA ~S803

ADD MOVING IMAGE FILE TO TRANSMISSION FILE LIST ~S804

OBTAIN RECORDING DATE AND TIME FROM RECORDING INFORMATION OF MOVING IMAGE FILE ~S805

EVERY METADATA FILE STORED IN FILE TRANSFER APPLICATION AREA ~S806

2

F I G.  8B
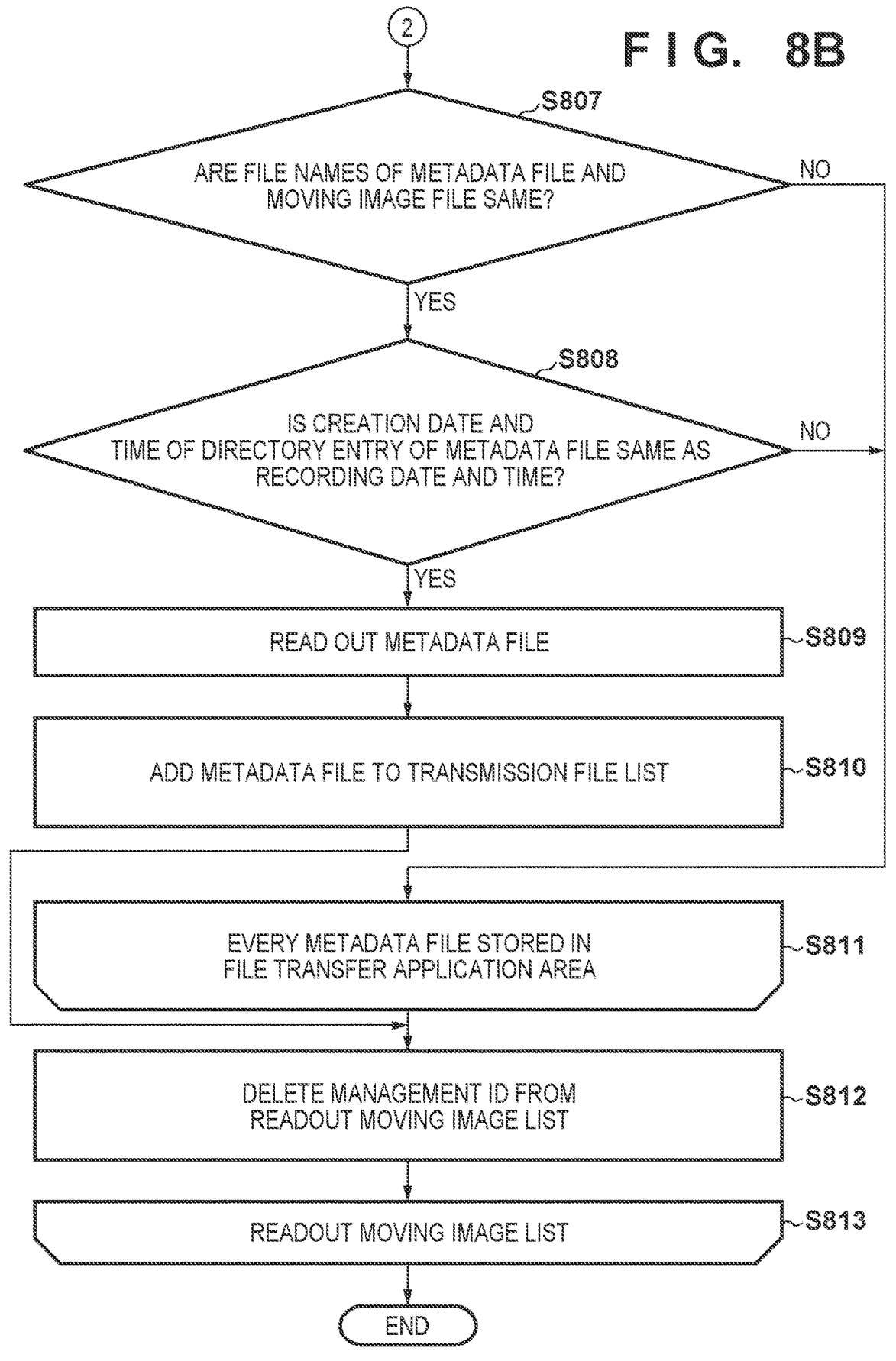

COMMUNICATION APPARATUS AND CONTROL METHOD

CROSS-REFERENCE TO RELATED APPLICATIONS

This application is a Continuation of International Patent Application No. PCT/JP2022/021179, filed May 24, 2022, which claims the benefit of Japanese Patent Application No. 2021-113139, filed Jul. 7, 2021, both of which are hereby incorporated by reference herein in their entirety.

BACKGROUND OF THE INVENTION

Field of the Invention

The present invention relates to a system in which an external apparatus and a communication apparatus are connected so as to be able to communicate with each other.

Background Art

PTL1 describes a technique to connect an image capture apparatus such as a digital camera to an external device such as a personal computer (PC) so as to be able to communicate with each other, and transmit contents stored in the image capture apparatus, including images and sounds, to the external device.

In recent years, the mass media industry such as press companies and communication companies has been facing an increasing need for speedy delivery of contents that have been captured at the site of news gathering, including images and sounds, to companies, and contents transfer solutions that involve intervention of various types of network communication have been provided. For example, as an application for a mobile device, a mobile application has been provided that has a function of transmitting contents generated on an image capture apparatus, including still images, moving images, and sounds, to a mobile device such as a smartphone, and transmitting the contents from the mobile device to an external server via a network using a communication method such as the File Transfer Protocol (FTP).

As an extremely large volume of contents are delivered to press companies and communication companies, some forms of search method and management method are necessary to efficiently use such data. Especially, in searching for and managing image data such as still images and moving images, the presence of metadata, which is supplementary information related to image data (main data), provides efficiency.

Furthermore, some image capture apparatuses have a function of storing both image data and metadata. For example, there are video cameras and the like that store metadata for each piece of image data using a file format different from the pieces of image data. Metadata is stored in an image capture apparatus as a metadata file in a data description language format such as eXtensible Markup Language (XML).

Moreover, in order to allow metadata to be used in a server, the aforementioned mobile application needs to store a metadata file and transmit the same to the server, in addition to a main data file of the content stored in an image capture apparatus.

Also, some mobile applications include an image management application that stores an image file, reads out the stored image file, and transfers the image file to a server. The image management application is an application dedicated for collective viewing and editing of image files.

CITATION LIST

Patent Literature

PTL1: Japanese Patent Laid-Open No. 2007-166577

In some cases, the image management application is configured in such a manner that only a main data file comprised of image data can be stored as a management target, and other data files of metadata and the like cannot be stored as a management target. For this reason, in a case where a mobile application stores a main data file on an image management application, reads out the stored main data file, and transfers the main data file to a server, the main data file is transferred to the server but a metadata file is not transferred to the server; as a result, the server cannot use metadata of image data.

SUMMARY OF THE INVENTION

The present invention has been made in view of the foregoing problem, and enables transmission of an image file and a supplementary information file obtained from a first external apparatus to a second external apparatus.

In order to solve the aforementioned problems, the present invention provides s communication apparatus that communicates with an external apparatus, comprising: an obtainment unit that obtains, from a first external apparatus, an image file and a supplementary information file related to the image file; a first management unit that stores the image file into a first area of a storage unit; a second management unit that stores the supplementary information file associated with the image file into a second area that is different from the first area; and a control unit that transmits, to a second external apparatus, the image file that has been read out from the first area, and the supplementary information file that has been read out from the second area and associated with the image file that has been read out from the second area.

In order to solve the aforementioned problems, the present invention provides a control method for a communication apparatus that communicates with an external apparatus, comprising: obtaining, from a first external apparatus, an image file and a supplementary information file related to the image file; storing the image file into a first area of a storage unit; storing the supplementary information file associated with the image file into a second area that is different from the first area; and transmitting, to a second external apparatus, the image file that has been read out from the first area, and the supplementary information file that has been read out from the second area and associated with the image file, wherein the obtaining includes requesting the first external apparatus for list information of files stored in the first external apparatus, and receiving, from the first external apparatus, an image file and a supplementary information file selected from the list information of the files received from the first external apparatus.

Further features of the present invention will become apparent from the following description of exemplary embodiments with reference to the attached drawings.

BRIEF DESCRIPTION OF THE DRAWINGS

FIG. 2A is a block diagram showing a configuration of a camera device 100 according to the present embodiment.

FIG. 5 is a software configuration diagram of the mobile device 200 according to the present embodiment.

FIG. 6A is a diagram exemplarily showing a UI screen of a file transfer application 301 of the mobile device 200 according to the present embodiment.

FIG. 6B is a diagram exemplarily showing a UI screen of the file transfer application 301 of the mobile device 200 according to the present embodiment.

FIG. 6C is a diagram exemplarily showing a UI screen of the file transfer application 301 of the mobile device 200 according to the present embodiment.

FIG. 6D is a diagram exemplarily showing a UI screen of the file transfer application 301 of the mobile device 200 according to the present embodiment.

FIG. 6E is a diagram exemplarily showing a UI screen of the file transfer application 301 of the mobile device 200 according to the present embodiment.

FIG. 6F is a diagram exemplarily showing a UI screen of the file transfer application 301 of the mobile device 200 according to the present embodiment.

FIG. 7A is a flowchart showing processing for storing moving image files and metadata files executed by the mobile device 200 according to the present embodiment.

FIG. 7B is a flowchart showing processing for storing moving image files and metadata files executed by the mobile device 200 according to the present embodiment.

FIG. 8A is a flowchart showing processing for reading out moving image files and metadata files executed by the mobile device 200 according to the present embodiment.

FIG. 8B is a flowchart showing processing for reading out moving image files and metadata files executed by the mobile device 200 according to the present embodiment.

DESCRIPTION OF THE EMBODIMENTS

Figure 1:
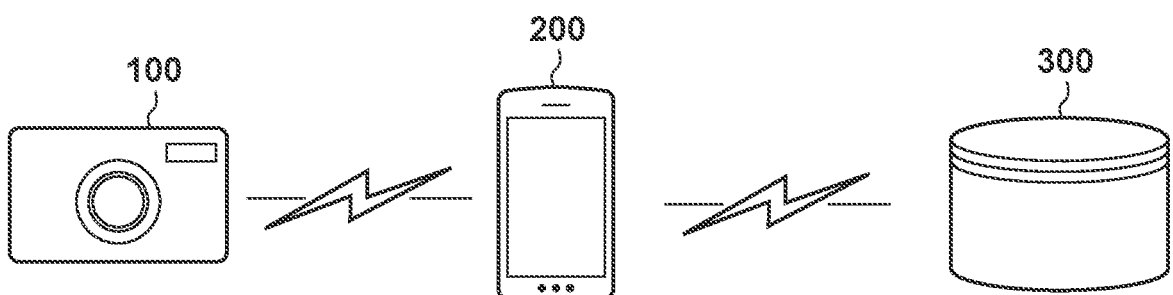
FIG. 1 is a system configuration diagram according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to the attached drawings, the following provides a detailed description of an embodiment in which an image capture apparatus of the present invention is applied to a camera device such as a digital camera, a communication apparatus of the present invention is applied to a mobile device such as a smart device, which is one type of mobile telephone, and a tablet device, and an information processing apparatus of the present invention is applied to a server that provides various services to the mobile device, which acts as a client.

<System Configuration>

First, a system configuration according to the present embodiment will be described with reference to FIG. 1.

The system according to the present embodiment includes a camera device 100, a mobile device 200, and a server 300. The camera device 100 and the mobile device 200 are connected so as to be able to communicate with each other via wireless antennas or a wired cable. The camera device 100 can transfer moving image files and sound files generated by the camera device 100 to the mobile device 200. The mobile device 200 and the server 300 are connected so as to be able to communicate with each other via mobile data communication that uses a line based on 4G/LTE, 5G, and the like. The mobile device 200 can transfer various types of information stored in the mobile device 200 to the server 300 using a communication method such as the File Transfer Protocol (FTP).

Note that the system configuration according to the present embodiment is not limited to the foregoing example; for instance, the camera device 100, the mobile device 200, and the server 300 may be connected to the same network via an access point without using mobile data communication to realize processing for file transfer among the discrete apparatuses.

<Configuration of Camera Device 100>

First, a configuration and functions of the camera device 100 according to the present embodiment will be described with reference to FIG. 2A.

Note that although the present embodiment describes a camera device such as a digital camera, no limitation is intended by this, and the camera device may be an information processing apparatus such as a tablet device and a personal computer equipped with a camera function, a media player, a surveillance camera, a medical camera, and the like.

A control unit 101 is a central processing unit (CPU) that performs integrated control on the entire camera device 100, and realizes later-described communication processing and control processing by executing a program stored in a later-described nonvolatile memory 103. Note that the entire apparatus may be controlled by a plurality of items of hardware sharing processing, instead of the control unit 101 controlling the entire apparatus.

An image capturing unit 102 includes a lens assembly including a zoom lens and a focus lens, and a shutter that has a diaphragm function. Also, the image capturing unit 102 includes an image sensor comprised of, for example, a CCD or CMOS element that converts a subject image into electrical signals, and an A/D converter that converts analog image signals output from the image sensor into digital signals. Under control of the control unit 101, the image capturing unit 102 converts light of the subject image formed by the lenses included in the image capturing unit 102 into electrical signals with use of the image sensor, executes noise reduction processing and the like, and outputs image data comprised of digital signals.

The control unit 101 executes pixel interpolation, resize processing such as reduction, and color conversion processing with respect to image data captured by the image capturing unit 102. Also, the control unit 101 generates image files by compressing and encoding still image data to which image processing has been applied using a JPEG format and the like, and encoding moving image data using a moving image compression method such as an MP4 format, and records the image files into a recording medium 110. In the camera device 100 according to the present embodiment, image data is recorded into the recording medium 110 in conformity with the standard of Design Rule for Camera File system (DCF). Furthermore, the control unit 101 executes predetermined computation processing using captured image data, and the control unit 101 controls the focus lens, diaphragm, and shutter of the image capturing unit 102 based on the obtained computation result; as a result, autofocus (AF) processing and automatic exposure (AE) processing are executed.

The nonvolatile memory 103 is an electrically erasable and recordable memory; for example, an EEPROM or the like is used thereas. Constants for the operations of the control unit 101, a program, and the like are recorded in the nonvolatile memory 103. The program mentioned here refers to a program for executing communication processing and control processing, which will be described later in the present embodiment.

A working memory 104 is used as a working area to which constants and variables for the operations of the control unit 101, the program that has been read out from the nonvolatile memory 103, and the like are deployed. Furthermore, the working memory 104 is used as a buffer memory that temporarily holds image data captured by the image capturing unit 102, and as an image display memory for a display unit 106.

Figure 2B:
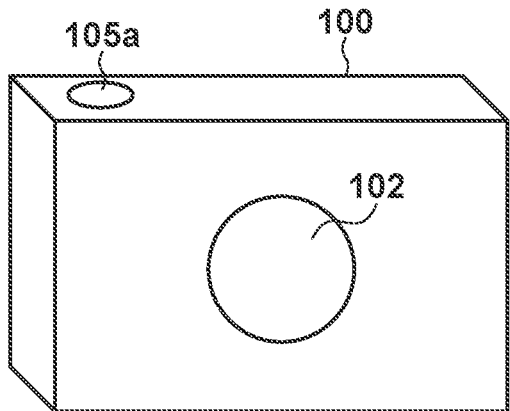
FIG. 2B is a front view showing the configuration of the camera device 100 according to the present embodiment.
Figure 2C:
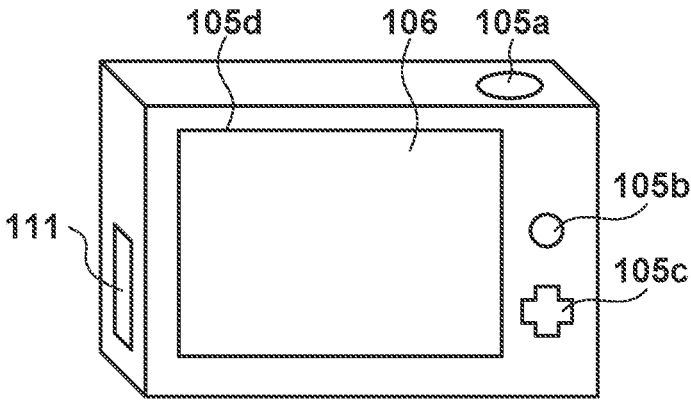
FIG. 2C is a rear view showing the configuration of the camera device 100 according to the present embodiment.

An operation unit 105 is comprised of operation members that accept various types of operations from a user, such as various types of switches, buttons, and a touch panel. For example, as shown in FIG. 2B and FIG. 2C, the operation unit 105 includes a shutter button 105a for capturing images, a reproduction button 105b for reproducing captured images, a four-directional key 105c comprised of up, down, left, and right buttons for configuring various types of camera settings, and so forth. Furthermore, a touch panel 105d that is formed integrally with the later-described display unit 106 is also included in the operation unit 105. In addition, the operation unit 105 includes an operation member, such as a dedicated connection button, for starting communication with an external apparatus via a later-described communication unit 111.

The display unit 106 displays viewfinder images during image capture, captured images, characters for interactive operations, and so forth. The display unit 106 is, for example, a display device such as a liquid crystal display and an organic EL display. The display unit 106 may be configured to be integrated with the camera device 100, or may be an external apparatus connected to the camera device 100. It is sufficient that the camera device 100 be capable of connecting to the display unit 106, and have a function of controlling display on the display unit 106.

A sound input unit 107 uses one or more microphones built in the camera device 100 or connected via a sound terminal to collect the sounds around the camera device 100 and converts them into electrical signals. The sound input unit 107 converts analog sound signals that have been generated by collecting the sounds around the camera device 100 into digital signals, and outputs the digital signals to the control unit 101. The control unit 101 generates sound data by executing various types of sound processing with respect to the digital signals generated by the sound input unit 107. The microphones may be directional microphones or nondirectional microphones. The control unit 101 generates a sound file by compressing and encoding the sound data generated by the sound input unit 107 using a WAV format and the like, and records the sound file into the recording medium 110.

The recording medium 110 records image data output from the image capturing unit 102 and sound data output from the sound input unit 107. Also, the control unit 101 reads out image files and sound files stored in the recording medium 110 in a reproduction mode. The recording medium 110 may be, for example, a memory card or a hard disk drive attached to the camera device 100, or may be a flash memory or a hard disk drive built in the camera device 100. It is sufficient that the camera device 100 include at least a component for accessing the recording medium 110.

The communication unit 111 is an interface for connecting to an external apparatus, such as the mobile device 200. The camera device 100 according to the present embodiment can exchange data with an external apparatus via the communication unit 111. For example, image data generated by the image capturing unit 102 and sound data generated by the sound input unit 107 can be transmitted to an external apparatus via the communication unit 111. Note that in the present embodiment, the communication unit 111 includes an interface for communicating with an external apparatus via a wireless LAN in conformity with the IEEE 802.11 standard. The control unit 101 realizes wireless communication with an external apparatus by controlling the communication unit 111. Note that the communication method is not limited to the wireless LAN, and can include, for example, a wireless communication interface such as an infrared communication interface and Wireless USB, and a wired communication interface such as a USB cable, HDMI (registered trademark), and IEEE 1394.

Note that the communication unit 111 of the camera device 100 according to the present embodiment has an AP mode in which it operates as an access point in an infrastructure mode, and a CL mode in which it operates as a client in the infrastructure mode. Then, by causing the communication unit 111 to operate in the CL mode, the camera device 100 according to the present embodiment can operate as a CL device in the infrastructure mode. When operating as a CL device, the camera device 100 can join a network formed by an AP device therearound by connecting to the AP device. Furthermore, by causing the communication unit 111 to operate in the AP mode, the camera device 100 according to the present embodiment can also operate as a simplified AP (hereinafter, a simple AP), which is one type of AP but is more limited in function. When the camera device 100 operates as a simple AP, the camera device 100 forms a network by itself. An apparatus around the camera device 100 can recognize the camera device 100 as an AP device, and join the network formed by the camera device 100. It is assumed that a program for causing the camera device 100 to operate in the above-described manner is held in the nonvolatile memory 103.

Note that the camera device 100 according to the present embodiment is a simple AP that is one type of AP but does not have a gateway function of transferring data received from a CL device to an Internet provider and the like. Therefore, even if the camera device has received data from another apparatus that is joining a network formed by the camera device itself, the camera device cannot transfer the data to a network such as the Internet.

7

8

<Directory Structure of Files Stored in Recording Medium 110>

Next, a directory structure of files stored in the recording medium 110 will be described with reference to FIG. 3.

The recording medium 110 has been formatted using a file system that allows reference from an operating system (OS), such as Extended File Allocation Table (exFAT).

The control unit 101 records moving image data generated by the image capturing unit 102 as moving image files in the MP4 format under the directory "100_0420" (the last four digits are assumed to be the current date) under the "DCIM" directory. Furthermore, based on metatemplate information that has been read out from the nonvolatile memory 103, the control unit 101 generates metadata files (supplementary information files) in which metadata of the moving image files has been described in the eXtensible Markup Language (XML) format. Metadata is supplementary information that is used for data management at the transmission destination of the moving image data, and information such as a category, a title, and a comment of the moving image data is input to related tags of the XML files.

The control unit 101 records sound data generated by the sound input unit 107 as sound files in the WAV format under the "AUDIO" directory under the "PRIVATE" directory.

Furthermore, when the image capturing unit 102 and the sound input unit 107 have generated moving image data and sound data, the control unit 101 generates or updates a catalog file for file management under the "GANONMSC" directory under the "DCIM" directory. Recorded in the catalog file is file information pieces in which the file names and the recording dates and times of the files stored in the recording medium 110 are associated with each other. The recording medium 110 stores the moving image files recorded in the MP4 format, the metadata files recorded in the XML format, the sound files recorded in the WAV format, and the catalog file for managing file information pieces of respective files.

<Configuration of Mobile Device 200>

Figure 4:
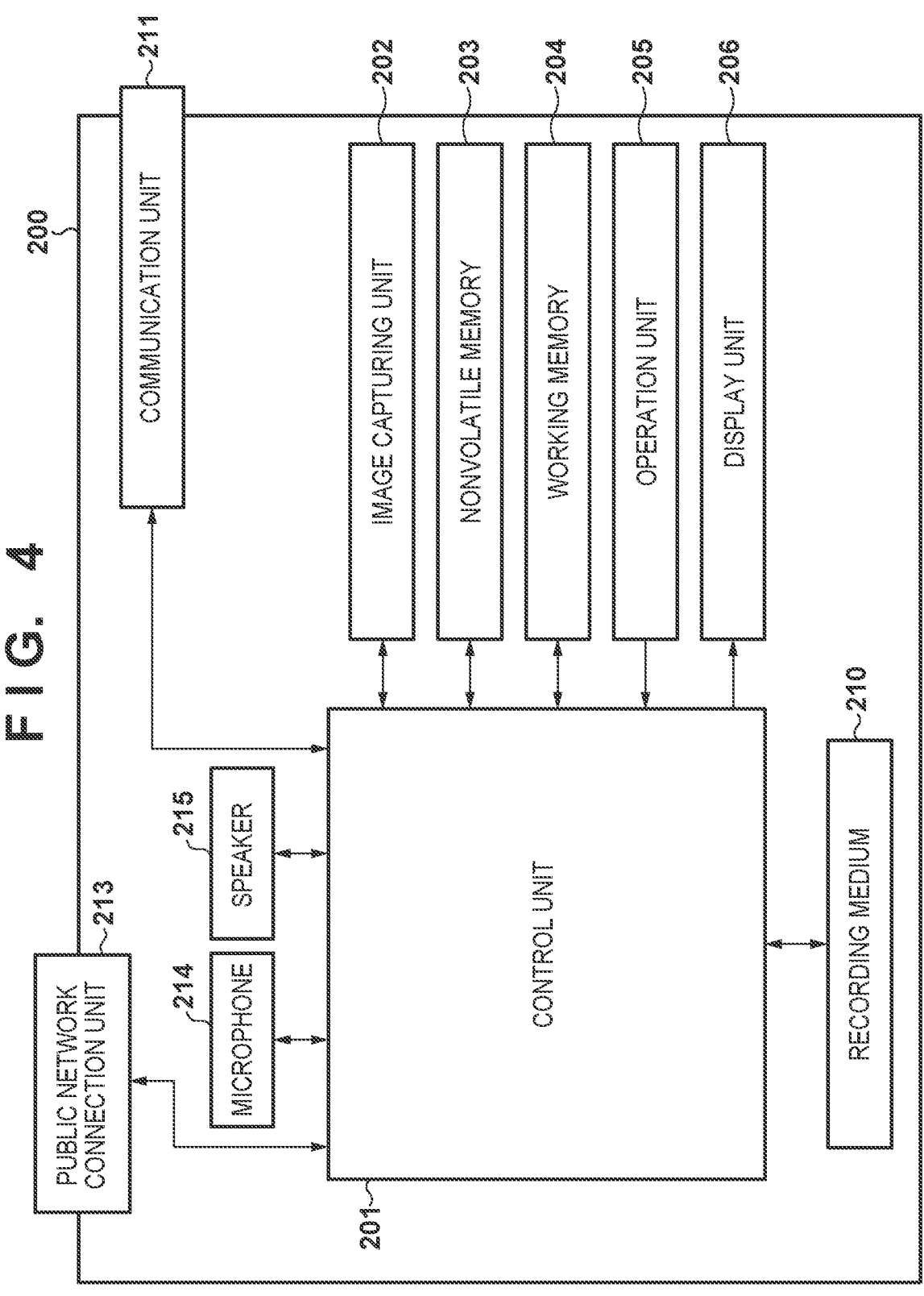
FIG. 4 is a block diagram showing a configuration of a mobile device 200 according to the present embodiment.

Next, a configuration and functions of the mobile device 200 according to the present embodiment will be described with reference to FIG. 4.

Although the present embodiment describes a mobile device such as a smartphone, which is one type of mobile telephone, no limitation is intended by this, and the mobile device may be a digital camera equipped with a communication function, a tablet device, a personal computer, a wristwatch-shaped smartwatch, a wearable computer such as eyeglass-shaped smartglasses, and so forth.

The mobile device 200 according to the present embodiment includes a control unit 201, an image capturing unit 202, a nonvolatile memory 203, a working memory 204, an operation unit 205, a display unit 206, a recording medium 210, and a communication unit 211. The basic functions of these elements are similar to those of the camera device 100, and a detailed description thereof is omitted.

The nonvolatile memory 203 stores an operating system (OS), which is basic software executed by the control unit 201, and an application that realizes applicative functions in coordination with this OS. Also, the nonvolatile memory 203 stores an application for communicating with the camera device 100 and the server 300. Furthermore, the nonvolatile memory 203 stores a file transfer application for communicating with the camera device 100 and the server 300. Moreover, the nonvolatile memory 203 stores a file management application that stores and manages image files of still image data, moving image data, and the like obtained from the camera device 100, and metadata files and sound files related to the image files. In addition, the nonvolatile memory 203 stores an image management application that stores and manages particularly the image files among the image files of still image data, moving image data, and the like obtained from the camera device 100 and the metadata files and the sound files related to the image files.

Processing of the mobile device 200 according to the present embodiment is realized by reading in software provided by applications. Note that the applications are assumed to include software for using basic functions of the OS installed on the mobile device 200. Note that the OS of the mobile device 200 may include software for realizing processing in the present embodiment.

The communication unit 211 includes a wireless communication interface for wirelessly communicating with an external apparatus such as the camera device 100 and the server 300. The control unit 201 realizes wireless communication with an external apparatus by controlling the communication unit 211. Note that the communication unit 211 may be connected directly to the camera device 100 and the server 300, or may be configured to be connected thereto via an access point. For example, the Picture Transfer Protocol over Internet Protocol (PTP/IP) via the wireless LAN can be used as a protocol for data communication. Note that communication with the camera device 100 and the server 300 is not limited to the foregoing. For example, the communication unit 211 can include a wireless communication module such as an infrared communication module, a Bluetooth (registered trademark) communication module, and Wireless USB. Furthermore, a wired connection interface such as a USB cable, HDMI (registered trademark), and IEEE 1394 may be used.

A public network connection unit 213 is an interface used in performing wireless communication via a wide area network (WAN) such as 4G/LTE and 5G. The mobile device 200 can call, or perform data communication with, another device via the public network connection unit 213. During a call, the control unit 201 handles input and output of sound signals via a microphone 214 and a speaker 215. In the present embodiment, the public network connection unit 213 is not limited to using 4G/LTE or 5G, and may use other communication methods including local 5G, WiMAX, ADSL, and FTTH. In the present embodiment, the public network connection unit 213 is an antenna, and the control unit 201 can connect to a public network via the antenna. Note that the communication unit 211 and the public network connection unit 213 need not necessarily be comprised of independent hardware, and one antenna may double as both of them, for instance.

Note that as the communication speed of communication realized by the communication unit 211 is higher than the communication speed of communication realized by the public network connection unit 213, the mobile device 200 according to the present embodiment prioritizes communication via the communication unit 211 in a state where it is not calling another device via the public network connection unit 213.

<Software Configuration of Mobile Device 200>

Next, a software configuration of the mobile device 200 according to the present embodiment will be described with reference to FIG. 5.

In the mobile device 200 according to the present embodiment, the nonvolatile memory 203 stores fixed data such as parameters, and software such as firmware.

The recording medium 210 stores an OS 310 that is basic software executed by the control unit 201, as well as a file management application 306 and an image management application 308 that are items of applicative software executed by the control unit 201. It also stores, as an item of applicative software, a file transfer application 301 that has a function of connecting to the camera device 100 and obtaining and storing files, and of connecting to the server 300 and transferring the files.

When a user has turned ON a power switch included in the operation unit 205 of the mobile device 200, the mobile device 200 is activated, and the control unit 201 reads out the OS 310 from the recording medium 210, deploys the same to the working memory 204, and executes the same. Furthermore, various components of the mobile device 200 are controlled in accordance with the OS 310 and an application installed on the OS 310.

The OS 310 not only has a function of controlling various components of the mobile device 200, but also provides a variety of services to applications. The OS 310 includes a communication service 311 as a function according to the present embodiment.

The communication service 311 controls ON/OFF of a communication function, connection to an external apparatus, and data communication with the connected external apparatus. It also controls provision of data obtained through the communication function to applications, and transmission/reception of data to/from an external apparatus in response to requests from applications.

The file management application 306 includes a file management service 307 that manages files stored in the recording medium 210. Also, the file management application 306 controls readout of managed files from the recording medium 210, and writing of files to the recording medium 210 in response to requests from applications.

The image management application 308 includes an image management service 309 that manages image files of still images and moving images stored in the recording medium 210. Unlike the file management application 306, the image management application 308 has functions focused on management of image files, such as a function of displaying a list of thumbnails of image files, and a function of frame-by-frame advance of moving image files. Also, the image management application 308 controls readout of managed files from the recording medium 210, and writing of files to the recording medium 210 in response to requests from applications.

Note, it is assumed that the files managed by the file management application 306 and the files managed by the image management application 308 are stored in different areas of the recording medium 210, and they cannot refer to each other.

Next, the file transfer application 301 according to the present embodiment will be described.

Through display control 302, the file transfer application 301 generates UI screens to be displayed on the display unit 206. The configuration of the UI screens will be described later using FIGS. 6A to 6G.

Through communication service control 303, the file transfer application 301 communicates with the camera device 100 using the communication service 311, and obtains main data of each file stored in the camera device 100, information of a list of files, and file information pieces of respective files. It also reads out files stored in the recording medium 210 and transmits them to the server 300 using the communication service 311.

Through file management service control 304, the file transfer application 301 writes and stores main data files held in the working memory 204 to the recording medium 210 using the file management service 307.

Through image management service control 305, the file transfer application 301 writes and stores main data files held in the working memory 204 to the recording medium 210 using the image management service 309.

<Configuration of UI Screens>

Next, the configuration and functions of UI screens provided by the file transfer application 301 will be described with reference to FIGS. 6A to 6G.

A UI screen 501 shown in FIG. 6A is a function selection screen that is displayed while connected to the camera device 100 after the file transfer application 301 has been activated. The function selection screen 501 includes a button 502 for selecting a function of displaying the files stored in the camera device 100, and a button 503 for selecting a function of displaying the files stored in the recording medium 210 of the mobile device 200.

A UI screen 504 shown in FIG. 6B is a screen of a list of files stored in the camera device 100 connected to the mobile device 200. The list screen 504 is displayed when the button 502 has been tapped on the function selection screen 501.

The list screen 504 includes a button 505 for returning to a previous screen, as well as buttons 506 and 507 for selecting a recording medium 110 that acts as a file reference destination in a case where the camera device 100 includes a plurality of recording mediums 110. The list screen 504 of FIG. 6B is in a state where the recording medium 110 corresponding to the button 506 with underlined characters has been selected, and displays a list of files stored in the recording medium 110 displayed under the button 506.

Parts 508 to 514 on the list screen 504 of FIG. 6B are generated from information of a list of files stored in the camera device 100 connected to the mobile device 200 and from information related thereto. Note that the following describes contents displayed by the parts 508 to 512; a method of obtaining information related to files for displaying the discrete parts 508 to 512 will be described later using FIGS. 7A and 7B and FIGS. 8A and 8B.

The part 508 is a part for displaying a thumbnail of a file; it displays a thumbnail appended to a moving image file in the case of a moving image file, and displays an image indicating a sound file stored in the nonvolatile memory 203 in the case of a sound file.

The part 509 is an icon indicating that a moving image file or a sound file is a proxy file. A proxy file is a file with data that has been reduced in size by lowering the bit rate or the resolution compared to a normal file, and the user can determine that a file is a proxy file when the fourth letter of its file name is "P". On the list screen 504 of FIG. 6B, every file is a proxy file, and thus the icon 509 is superimposed and displayed on every thumbnail.

The part 510 is a character string indicating a file name, and the part 511 is a character string indicating the recording date and time of a file.

The part 512 is an icon indicating whether a metadata file indicating metadata of a moving image file is stored in the same recording medium.

The parts 513 and 514 are icons indicating a selected/unselected state of a file, and are superimposed and displayed on the thumbnail 508. The icon 513 indicates a selected state, whereas the icon 514 indicates an unselected state. Each time the thumbnail 508 of any file is tapped, the selected/unselected state of the file is switched, and the icon that is displayed in accordance with the selected/unselected state of the file is switched to the icon 513 or the icon 514.

A button 515 is a button for starting the storing of files from the camera device 100 to the mobile device 200. The files to be stored are the files in the selected state.

Parts 516 to 518 on the list screen 504 of FIG. 6C are buttons for selecting an application to which files imported from the camera device 100 to the mobile device 200 are to be stored in a state where the camera device 100 is connected to the mobile device 200, and are superimposed and displayed on the list screen 504 when the button 515 on the list screen 504 of FIG. 6B has been tapped.

The part 516 is a button for selecting the file management application 306 as the application to which the files are to be stored. Tapping the button 516 will start processing for transferring the files stored in the camera device 100 to the mobile device 200 and storing them into the file management application 306. Here, the files to be stored into the file management application 306 are files in the selected state and metadata files related to the files in the selected state.

The part 517 is a button for selecting the image management application 308 as the application to which the files are to be stored. Tapping the button 517 will start processing for transferring the files stored in the camera device 100 to the mobile device 200 and storing them into the image management application 308. Here, as the image management application 308 is an application that is capable of managing image files, the files to be stored into the image management application 308 are only moving image files in the selected state.

The button 518 is a button for cancelling the storing of files. Tapping the button 518 results in a return to the list screen 504 of FIG. 6B.

Parts 519 to 521 on the function selection screen 501 of FIG. 6D are buttons for selecting an application that serves as a readout source when files are read out from the recording medium 210, and are superimposed and displayed on the function selection screen 501 of FIG. 6A when the button 503 on the function selection screen 501 of FIG. 6A has been tapped.

The part 519 is a button for selecting the file management application 306 as the application that serves as the file readout source. Tapping the button 519 will start processing for reading out files from the file management application 306. A screen for selecting the files managed by the file management application 306 will be described later using FIG. 6E.

The part 520 is a button for selecting the image management application 308 as the application that serves as the file readout source. Tapping the button 520 will start processing for reading out files from the image management application 308. A screen for selecting the files managed by the image management application 308 will be described later using FIG. 6F.

The button 521 is a button for cancelling the readout of files; tapping the button 521 results in a return to the function selection screen 501 of FIG. 6A.

A UI screen 522 shown in FIG. 6E is a screen provided by the OS 310, and is a selection screen for selecting files to be read out from among the files managed by the file management application 306. When the button 519 on the function selection screen 501 of FIG. 6D has been tapped, the selection screen 522 is superimposed and displayed on the function selection screen 501 of FIG. 6A. In the present embodiment, it is assumed that the files that can be selected on the selection screen 522 are only moving image files in the MP4 format and sound files in the WAV format.

The selection screen 522 of FIG. 6E includes parts 523 to 529.

The part 523 is a button for returning to a previous screen; when the return button 523 has been tapped, the function selection screen 501 of FIG. 6A is displayed.

Figure 6G:
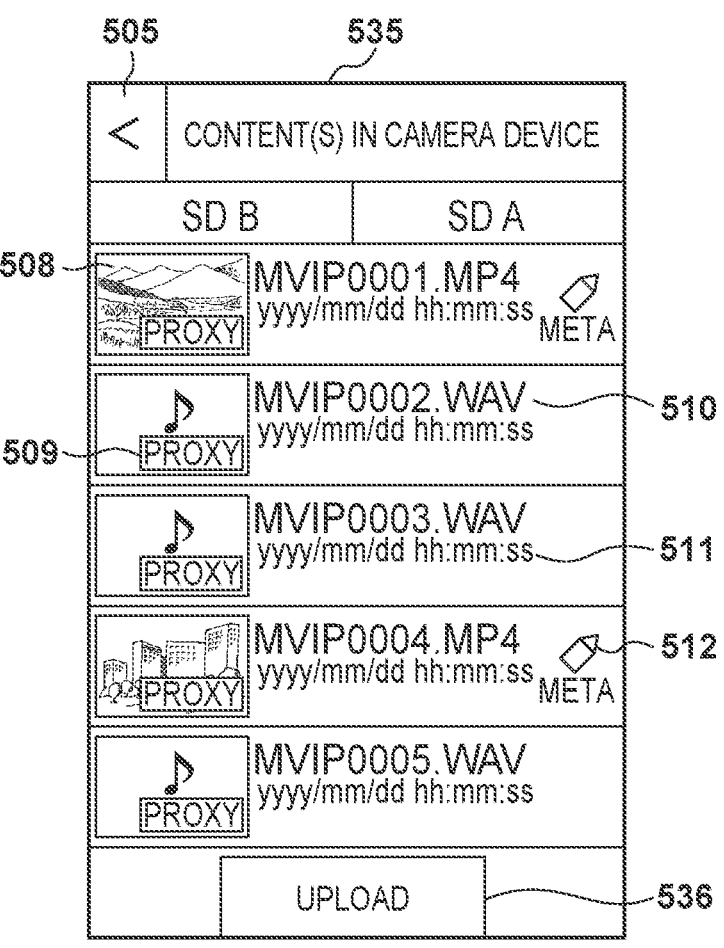
FIG. 6G is a diagram exemplarily showing a UI screen of the file transfer application 301 of the mobile device 200 according to the present embodiment.

The part 524 is a button for completing the file selection; when the button 524 has been tapped, a list screen 535, which will be described later using FIG. 6G, is displayed.

The part 525 is a part for displaying a thumbnail of a file; it displays a thumbnail appended to a moving image file in the case of a moving image file, and displays an image indicating a sound file stored in the nonvolatile memory 203 in the case of a sound file.

The part 526 is a character string indicating a file name, and the part 527 is a character string indicating the recording date and time of a file.

The parts 528 and 529 are icons indicating a selected/unselected state of a file, and are superimposed and displayed on the thumbnail 525. The icon 528 indicates a selected state, whereas the icon 529 indicates an unselected state. Each time the thumbnail 525 of any file is tapped, the selected/unselected state of the file is switched, and the icon that is displayed in accordance with the selected/unselected state of the file is switched to the icon 528 or the icon 529.

A UI screen 530 shown in FIG. 6F is a screen provided by the OS 310, and is a selection screen for selecting files to be read out from among the files managed by the image management application 308. When the button 520 on the function selection screen 501 of FIG. 6D has been tapped, the selection screen 530 is superimposed and displayed on the function selection screen 501 of FIG. 6A. In the present embodiment, it is assumed that the files that can be selected on the selection screen 530 are only moving image files.

A button 531 is a button for cancelling the file selection and returning to a previous screen; tapping the return button 531 results in a return to the function selection screen 501 of FIG. 6D.

A button 532 is a button for completing the file selection; when the button 532 has been tapped, the list screen 535, which will be described later using FIG. 6G, is displayed.

A part 533 is a part for displaying a thumbnail of a file, and displays a thumbnail appended to a moving image file.

A part 534 is an icon indicating a selected state of a file, and is superimposed and displayed on the thumbnail 533. The icon 534 is displayed only when a file is in the selected state. When the thumbnail 533 of a file has been tapped, the selected/unselected state of the file is switched, and display/non-display of the icon 534 is switched in accordance with the selected/unselected state of the file.

The UI screen 535 shown in FIG. 6G is a screen of a list of files that have been selected on the selection screen 522 of FIG. 6E or the selection screen 530 of FIG. 6F, and is displayed when the button 524 on the selection screen 522 of FIG. 6E or the button 532 on the selection screen 530 of FIG. 6F has been tapped.

Parts 508 to 512 on the list screen 535 of FIG. 6G are similar to parts 508 to 512 on the list screen 504 of FIG. 6B, and are generated from information of a list of files that have been selected on the selection screen 522 of FIG. 6E or the selection screen 530 of FIG. 6F and read out from the recording medium 210, and from information related thereto. A method of obtaining information related to files for displaying the parts 508 to 512 will be described later using FIG. 10 to FIG. 12.

A button 505 is a button for returning to a previous screen; tapping the button 505 results in a return to the function selection screen 501 of FIG. 6A.

A button 536 is a button for starting processing for transmitting files from the mobile device 200 to the server 300. The files to be transmitted are all of the files displayed on the list screen 535.

Note that it is permissible to provide a function in which the files that have been selected on the list screen 504 of FIG. 6B from among the files stored in the camera device 100 are collectively transmitted to the server 300, without being stored into the mobile device 200.

<Functions of File Transfer Application 301>

Next, the functions of the file transfer application 301 according to the present embodiment will be described.

The file transfer application 301 according to the present embodiment has the following two functions.

The first function is to communicate with the camera device 100 and store moving image files, sound files, and metadata files obtained from the camera device 100 into the mobile device 200.

The second function is to communicate with the server 300 and transmit (upload) moving image files, sound files, and metadata files stored in the mobile device 200 to the server 300.

The foregoing first function and second function allow the file transfer application 301 to transfer moving image files, sound files, and metadata files stored in the camera device 100 to the server 300 via the mobile device 200.

Here, after the file transfer application 301 according to the present embodiment has communicated with the camera device 100 and imported files stored in the camera device 100 to the image management application 308, there is a possibility that the file transfer application 301 cannot realize the foregoing first and second functions when reading out files from the image management application 308 and transmitting them to the server 300.

When importing files stored in the camera device 100 to the image management application 308, the mobile device 200 communicates with the camera device 100 and obtains moving image files, sound files, and metadata files stored in the camera device 100. Subsequently, the mobile device 200 stores the files obtained from the camera device 100 into the recording medium 210 through the image management service control 305 of the file transfer application 301 with use of the image management service 309 of the image management application 308.

However, as stated earlier, the image management service 309 of the image management application 308 has functions focused on image files of still images, moving images, and the like. Therefore, although the file transfer application 301 considers image files as targets to be imported to the image management application 308, it does not consider metadata files as targets to be imported thereto. Therefore, on the mobile device 200, moving image files obtained from the camera device 100 are stored into the recording medium 210, but metadata files are not stored into the recording medium 210.

When the mobile device 200 communicates with the server 300, reads out moving image files stored in the recording medium 210, and transmits them to the server 300, moving image files are stored in the recording medium 210, but metadata files of moving image files are not recorded therein. Therefore, the mobile device 200 can transmit moving image files to the server 300, but cannot transfer metadata files thereto. That is to say, in the course of transfer of moving image files and metadata files from the camera device 100 to the server 300 via the mobile device 200, the metadata files are lost.

The following describes the operations of the mobile device 200 according to the present embodiment for solving the aforementioned problem.

When importing a moving image file stored in the camera device 100 to the image management application 308, the mobile device 200 stores the moving image file (main data file) into an area for recording files of the image management application 308 (hereinafter, an image management application area) in the recording medium 210 through the image management service control 305 of the file transfer application 301. Thereafter, the mobile device 200 stores a metadata file of the moving image file into an area for recording files managed by the file transfer application 301 (hereinafter, a file transfer application area) in the recording medium 210.

Note, it is assumed that the file transfer application area is an area different from the image management application area and an area for recording files managed by the file management application 306 (hereinafter, a file management application area).

Next, when reading out the moving image file from the image management application 308 and transmitting the same to the server 300, the mobile device 200 reads out the moving image file stored in the image management application area through the communication service control 303 of the file transfer application 301. Also, the mobile device 200 reads out the metadata file of the moving image file from the file transfer application area. Then, the mobile device 200 transmits the moving image file and the metadata file to the server 300.

Here, the mobile device 200 according to the present embodiment reads out the metadata file corresponding to the moving image file after reading out the moving image file from the image management application 308. Therefore, it is necessary to specify the metadata file corresponding to the moving image file from among the files stored in the file transfer application area for the file transfer application 301.

Figure 3:
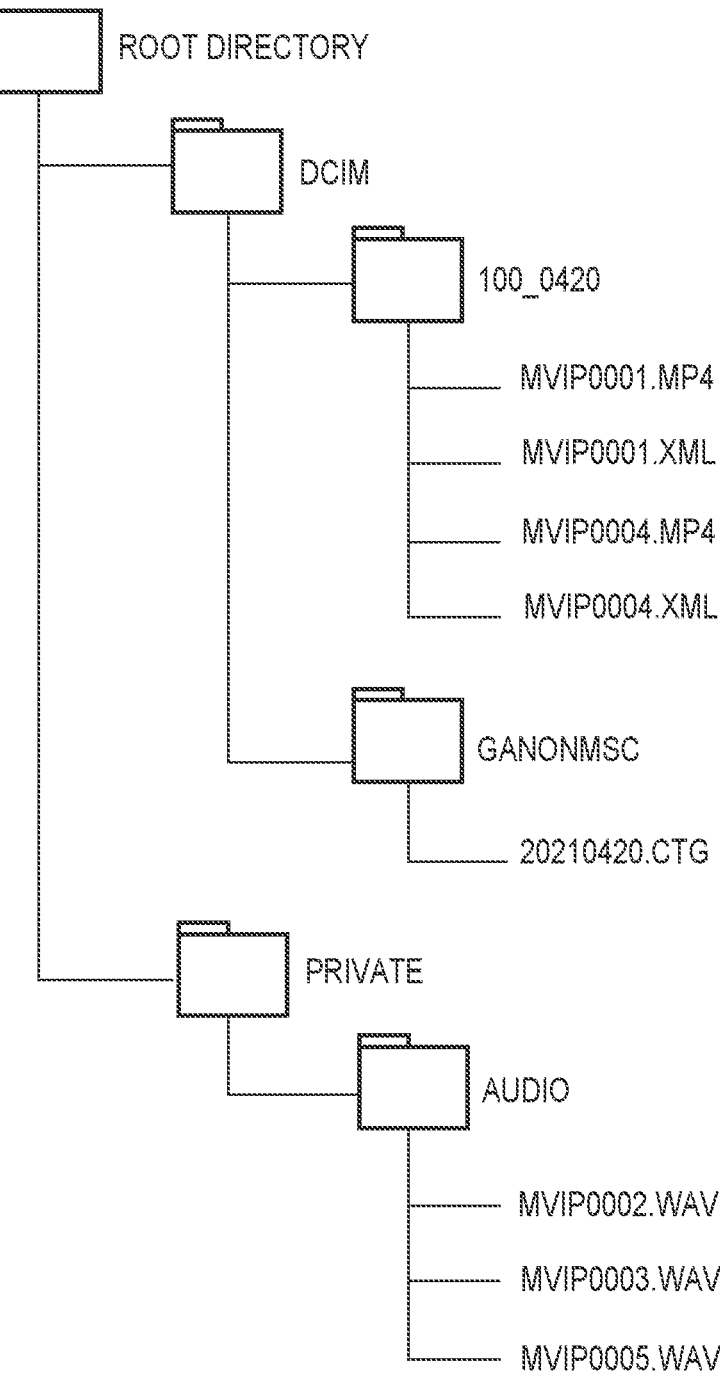
FIG. 3 is an explanatory diagram of directories of files stored in the camera device 100 according to the present embodiment.

As shown in FIG. 3, the file names of a moving image file and a metadata file stored in the camera device 100 according to the present embodiment have the same character string before the extension. Therefore, as a method in which the mobile device 200 specifies the metadata file corresponding to the moving image file, the following method is possible.

The mobile device 200 stores a moving image file received from the camera device 100 into the image management application area while the moving image file retains the file name of the moving image file stored in the camera device 100. Meanwhile, the mobile device 200 stores a metadata file received from the camera device 100 into the file transfer application area while the metadata file retains the file name of the metadata file stored in the camera device 100.

Then, the mobile device 200 has read out the moving image file from the image management application area, and then determines whether the file name of each file stored in the file transfer application area has the same character string as the file name of the moving image file before the extension. In a case where the file name has the same character string before the extension as a result of the determination, the file of this file name is determined to be the metadata file of the moving image file. In this way, the metadata file corresponding to the moving image file is specified.

Meanwhile, there are cases where the mobile device 200 cannot uniquely specify a metadata file corresponding to a moving image file by merely using the above-described determination of file names. For example, in a case where the camera device 100 records a moving image file, the moving image file is assigned a file name that does not overlap with the file names of files in the recording medium 110. However, in a case where a plurality of attachable/removable recording mediums 110 have been attached to the camera device 100, there are cases where file names overlap with one another among different recording mediums. In addition, under a naming rule that manages files with sequential numbers assigned thereto, in a case where the camera device 100 has reset the sequential numbers to be assigned, there may be an overlap with a file name of a moving image file that was recorded in the past.

In view of this, even in a case where a plurality of different moving image files are stored in the image management application area under the same file name, the mobile device 200 needs to manage a plurality of metadata files corresponding to these moving image files and uniquely specify a metadata file corresponding to a moving image file that has been read out.

The following describes an association method that is intended for the mobile device 200 to newly associate a moving image file stored in the image management application area with a metadata file stored in the file transfer application area.

When the mobile device 200 according to the present embodiment has read out a moving image file from the image management application 308, it determines whether the stored moving image file and metadata file have the same file name. Furthermore, the mobile device 200 determines whether a moving image file and a metadata file have been associated with each other by the association method to specify a metadata file corresponding to a moving image file.

The association method according to the present embodiment, as well as the method of determining whether the association has been made by the association method, will be described later using FIGS. 7A and 7B and FIGS. 8A and 8B.

<Processing for Obtaining Information of List of Files and File Information Pieces>

First, a description is given of processing in which the mobile device 200 obtains information of a list of files, as well as file information and main data of each file, from the camera device 100.

According to the present embodiment, in the files stored in the camera device 100, content IDs for identifying the respective files are recorded. In a case where the mobile device 200 obtains file information and main data from the camera device 100, it transmits a file obtainment request using a content ID.

The file information varies depending on the file type. The file information of a moving image file includes a file name and recording information at the time of recording of moving images. The recording information includes information during image capture, such as a recording date and time, a time period of recording, and a file size. Also, the file information of a metadata file includes a file name.

When the button 502 has been tapped on the function selection screen 501 of FIG. 6A, the mobile device 200 transmits a request to obtain a content ID list, which is made as a list of content IDs of all files stored in the camera device 100, as information of a list of files, and obtains the content ID list from the camera device 100. Then, the mobile device 200 transmits a request to obtain file information pieces with respect to the respective content IDs included in the content ID list, and obtains the file information pieces from the camera device 100. The mobile device 200 generates the list screen 504 of FIG. 6B using the file information pieces of respective files obtained from the camera device 100, and displays the same on the display unit 206.

<Processing for Storing Moving Image Files and Metadata Files, and Processing for Reading Out the Same>

Next, a description is given of storage processing in which the mobile device 200 stores moving image files and metadata files into the recording medium 210 when importing files stored in the camera device 100 to the image management application 308 of the mobile device 200. Furthermore, a description is given of readout processing in which the mobile device 200 reads out moving image files and metadata files from the recording medium 210 when reading out files from the image management application 308 of the mobile device 200 and transmitting the same to the server 300.

Note that the present embodiment is described using an example in which, when storing files, the creation date and time and the update date and time of a metadata file within a directory entry are overwritten using the recording date and time of a moving image file obtained from the camera device 100 as a method of associating a moving image file and a metadata file with each other.

At the time of file readout, the mobile device 200 obtains the recording date and time from recording information of a moving image file, and in a case where the recording date and time are the same as the creation date and time or the update date and time of a metadata file, the moving image file and the metadata file are determined to be associated with each other. Then, the mobile device 200 specifies a metadata file corresponding to a moving image file in combination with a determination as to whether the moving image file and the metadata file have the same file name.

Also, the recording medium 210 of the mobile device 200 has been formatted in conformity with a file system such as File Allocation Table (FAT). FAT allows metadata related to main data of a file to be recorded in a directory entry of a file system as an eXtensible Markup Language (XML) file. A directory entry is an area of a directory in which a file name, a file attribute (extension), and the like are recorded. Metadata includes, for example, a file name, a creator, a creation date and time, an update date and time, a storage location, a file size, and a pointer indicating a storage location of main data.

<Processing for Storing Moving Image Files and Metadata Files Executed by Mobile Device 200>

Next, processing for storing moving image files and metadata files executed by the mobile device 200 according to the present embodiment will be described with reference to FIGS. 7A and 7B.

The processing of FIGS. 7A and 7B is realized by the control unit 201 of the mobile device 200 deploying a program of an application (or functions of the application, the OS, a service of the OS, etc.) stored in the nonvolatile memory 203 to the working memory 204, and executing the program. Also, tapping of the button 517, which designates the image management application 308 as the storage destination, on the selection screen 504 of FIG. 6C acts as a trigger to start the processing of FIGS. 7A and 7B.

In S701, the control unit 201 adds all of the content IDs of moving image files that are in the selected state on the list screen 504 of FIG. 6B to a requested moving image list. The requested moving image list is made as a list of content IDs of moving image files that are requested to be obtained from the camera device 100. Also, content IDs of moving image files are information which is included in the above-described content ID list obtained from the camera device 100, and which is intended to identify moving image files that are requested to be obtained from the camera device 100.

Furthermore, the files to be stored into the image management application 308 are only moving image files; thus, among the files in the selected state, only content IDs of moving image files are added to the content ID list, and content IDs of sound files are not added to the list.

From S702 to S712, processing of S703 to S711 is executed repeatedly for each of the content IDs in the requested moving image list.

In S703, the control unit 201 transmits by the communication unit 211, to the camera device 100, a request to obtain a moving image file (main data file) corresponding to the content ID to be processed.

In S704, the control unit 201 determines whether the moving image file has been received from the camera device 100 by the communication unit 211 within a predetermined time period. In a case where the control unit 201 has determined that the moving image file has been received from the camera device 100, it causes the processing to proceed to S705; in a case where it has determined that the moving image file has not been received from the camera device 100, it causes the processing to return to S704 to wait for reception of the moving image file again.

In S705, the control unit 201 stores the moving image file received in S704 into the image management application area in the recording medium 210. Also, the control unit 201 creates a directory entry for the stored moving image file, and records the file name of this moving image file under the file name in the directory entry. The file name is a file name included in the above-described file information of each file obtained from the camera device 100.

In S706, the control unit 201 determines whether a metadata file corresponding to the moving image file stored in S705 is stored in the camera device 100. Here, it is determined that a metadata file with a file name which has a character string "XML" after "." (dot), and which has the same character string as the moving image file before "." (dot), is the metadata file corresponding to the moving image file stored in S705. The file name is a file name included in the above-described file information of each file obtained from the camera device 100. The control unit 201 refers to all file information pieces; the control unit 201 causes the processing to proceed to S707 in a case where it has been determined that there is a metadata file corresponding to the moving image file stored in S705, and causes the processing to proceed to S711 in a case where it has been determined that there is no such metadata file.

In S707, the control unit 201 uses the communication unit 211 to transmit a request to obtain a metadata file to the camera device 100 with use of the content ID of the metadata file specified in S706.

In S708, the control unit 201 determines whether the metadata file has been received from the camera device 100 by the communication unit 211 within a predetermined time period. In a case where the control unit 201 has determined that the metadata file has been received from the camera device 100, it causes the processing to proceed to S709; in a case where it has determined that the metadata file has not been received from the camera device 100, it causes the processing to return to S708 to wait for reception of the metadata file again.

In S709, the control unit 201 stores the metadata file received in S708 into the file transfer application area in the recording medium 210. Furthermore, the control unit 201 creates a directory entry for the stored metadata file, and records the file name of the stored metadata file under the file name in the directory entry. Also, the file name is a file name included in the above-described file information of each file obtained from the camera device 100.

In addition, depending on the file system, a restriction is placed that does not allow a plurality of files having the same file name to be recorded in one directory in the file transfer application area. Therefore, in S709, the control unit 201 newly creates a directory in a file system of the file transfer application area in the recording medium 210. Then, the control unit 201 sets, as a directory name of the generated directory, a random value that gives a file path to a storage destination different from that of other files that already exist in the file transfer application area. It is assumed that the control unit 201 then records the metadata file received in S708 into the newly created directory. In this way, a plurality of files that have the same file name can be stored into the file transfer application area in the recording medium 210.

In S710, the control unit 201 overwrites the creation date and time and the update date and time in the directory entry for the metadata file created in S709 using the recording date and time. The recording date and time is the recording date and time included in the above-described file information obtained from the camera device 100. As a result, the creation date and time and the update date and time in the directory entry for the metadata file are replaced with the recording date and time described in recording information of the moving image file corresponding to the metadata file.

In S711, the control unit 201 considers that the current content ID has already been processed, and deletes the same from the requested moving image list.

In S712, the control unit 201 causes the processing to return to S702 so that the next content ID in the requested moving image list is used as a processing target; in a case where processing has been completed with respect to every content ID, it ends the processing. The determination as to whether processing has been completed with respect to every content ID can be realized by the control unit 201 determining that no content ID is left in the requested moving image list (the requested moving image list is empty).

Note that although the present embodiment has been described using an example in which both of the creation date and time and the update date and time of a file are rewritten, one of the creation date and time and the update date and time of a file may be rewritten.

Furthermore, an area into which the recording date and time are recorded is not limited to the creation date and time and the update date and time in a directory entry for a metadata file; for example, the recording date and time may be recorded into an item for a file size, another file attribute, or the like in a directory entry.

<File Readout Processing Executed by Mobile
Device 200>

Next, processing for reading out moving image files and
metadata files executed by the mobile device 200 according
to the present embodiment will be described with reference
to FIGS. 8A and 8B.

The processing of FIGS. 8A and 8B is realized by the
control unit 201 of the mobile device 200 deploying a
program of an application (or functions of the application,
the OS, a service of the OS, etc.) stored in the nonvolatile
memory 203 to the working memory 204, and executing the
program. Also, tapping of the button 532 for completing the
file selection on the selection screen 530 of FIG. 6F acts as
a trigger to start the processing of FIGS. 8A and 8B.

In S801, the control unit 201 adds all of management IDs
of moving image files that are in the selected state on the
selection screen 530 of FIG. 6F to a readout moving image
list. The readout moving image list is made as a list of
management IDs of moving image files to be read out from
the image management application area in the recording
medium 210. Also, the management IDs are information for
identifying moving image files stored in the image manage-
ment application area in the recording medium 210. When
storing a moving image file, the control unit 201 generates
a management ID corresponding to the moving image file
and records the same into the recording medium 210. By
designating a management ID, the control unit 201 obtains
a moving image file corresponding to the management ID in
the image management application area, as well as a file
name in a directory entry for this moving image file. Note
that a file path indicating a storage location of a moving
image file in the image management application area may be
used instead of a management ID.

From S802 to S813, processing of S803 to S812 is
executed repeatedly for each of the management IDs in the
readout moving image list.

In S803, the control unit 201 specifies a file path to the
image management application area using a management ID
in the readout moving image list, and obtains a moving
image file (main data file).

In S804, the control unit 201 adds the moving image file
that has been read out in S803 to a transmission file list. The
transmission file list is made as a list of files to be transmitted
to the server 300. When the button 536 for starting file
transmission to the server 300 has been tapped on the list
screen 535 of the selected files in FIG. 6G, the control unit
201 transmits all of the files in the transmission file list to the
server 300.

In S805, the control unit 201 analyzes recording infor-
mation of the moving image file and obtains the recording
date and time. The recording information is recording infor-
mation included in the moving image file that has been read
out in S803.

From S806 to S811, processing of S807 to S810 is
executed repeatedly with respect to every metadata file
stored in the file transfer application area in the recording
medium 210.

The control unit 201 sequentially refers to directory
entries in which the metadata files are recorded in the file
transfer application area, thereby obtaining directory entry
information of each metadata file and a pointer indicating an
address of a recording destination of metadata itself.

In S807, the control unit 201 compares a file name in a
directory entry for the metadata file with a file name of the
moving image file that has been read out using the manage-
ment ID in S803, and determines whether the file names have the same character string before "." (dot). In a case
where the control unit 201 has determined that the file names
are the same, it causes the processing to proceed to S808; in
a case where it has determined that the file names are not the
same, it causes the processing to proceed to S811.

In S808, the control unit 201 compares the creation date
and time in the directory entry for the metadata file with the
recording date and time obtained in S805, and determines
whether they are the same. In a case where the control unit
201 has determined that they have the same date and time,
it causes the processing to proceed to S809; in a case where
it has determined that they do not have the same date and
time, it causes the processing to proceed to S811.

In S809, the control unit 201 reads out the metadata itself
in the file transfer application area with use of the pointer
indicating the address of the recording destination of the
metadata itself in the directory entry for the metadata file.

In S810, the control unit 201 adds the metadata file that
has been read out in S809 to the transmission file list. The
transmission file list is the transmission file list used in S804.

In S811, the control unit 201 causes the processing to
return to S806 so that the next metadata file that is already
stored in the file transfer application area is used as a
processing target. Also, in a case where processing for all of
the metadata files that are already stored in the file transfer
application area has been completed, the control unit 201
causes the processing to proceed to S812.

In S812, the control unit 201 considers that the current
management ID has already been processed, and deletes the
same from the readout moving image list.

In S813, the control unit 201 causes the processing to
return to S802 so that the next management ID in the readout
moving image list is used as a processing target; in a case
where processing has been completed with respect to every
management ID, it ends the processing. The determination
as to whether processing has been completed with respect to
every management ID can be realized by the control unit 201
determining that no management ID is left in the readout
moving image list (the readout moving image list is empty).

Modification Examples

According to the above-described embodiment, a moving
image file and a metadata file are associated with each other
by rewriting the creation date and time and the update date
and time of a directory entry of the metadata file into the
recording date and time of the moving image file. Also, in
order to specify the metadata file, the determination as to
whether the moving image file and the metadata file have
been associated with each other, and the determination as to
whether the file names of the moving image file and the
metadata file are the same, are made in combination. How-
ever, a method of specifying the metadata file is not limited
to these.

For example, the following method is possible: when
storing a metadata file, the association is made by recording
the recording date and time of a moving image file under a
directory name of a directory for storing this metadata file,
and the determination as to whether the association has been
made and the determination as to whether the file names of
the moving image file and the metadata file are the same are
combined.

The flowchart of FIGS. 7A and 7B shows an example in
which, as a result of storing files separately in directories to
which random values are given as directory names, a plu-
rality of files that have the same file name can be stored. The
present association method is intended to record the recording date and time of a moving image file instead of a random value. In a case where the present association method is used, during the file storage processing of FIGS. 7A and 7B, the mobile device 200 newly generates a directory, records the recording date and time under a directory name, and then stores a metadata file into the newly-generated directory.

Furthermore, as a method of determining that the association has been made by the present association method, the control unit 201 first determines, in the readout processing of FIGS. 8A and 8B, whether directories with directory names that are the same as the recording date and time exist in the file transfer application area. Then, in a case where such directories exist, the control unit 201 determines that the files recorded in such directories are metadata files associated with a moving image file.

In addition, a metadata file corresponding to the moving image file is specified by determining, from among the files recorded in the directories, a metadata file with a file name that is the same as a file name of the moving image file before the extension.

Furthermore, as another example, there is a method in which a metadata management table for managing metadata files in the file transfer application area of the recording medium 210 is stored. The metadata management table is made as a list of information blocks of the respective metadata files. Recorded in each information block is a file path to a recording area of one metadata file stored in the file transfer application area and the file name and the recording date and time of a moving image file corresponding to this metadata file, which are associated with each other, as one information block.

In a case where the present association method is used, during the processing of FIGS. 7A and 7B, when the mobile device 200 stores a metadata file corresponding to a moving image file after storing the moving image file, it records the file name and the recording date and time of the moving image file, as well as a file path to a recording area of the metadata itself that has been recorded, into the metadata management table as one information block.

Furthermore, a method of determining that the association has been made by the present association method is as follows. In the processing of FIGS. 8A and 8B, when a metadata file is read out from the file transfer application area after a moving image file has been read out on the mobile device 200, whether the file name and the recording date and time of the moving image file that has been read out match the file name and the recording date and time recorded in each information block in the metadata management table is determined. Thereafter, a metadata file is designated and read out from a file path described in the information block with the matching file name and recording date and time.

Note that the information recorded in each information block of the metadata management table may be a management ID corresponding to the moving image file, which is generated by the image management application 308 when storing the moving image file in S705 of FIG. 7A, rather than the two pieces of information, namely the file name and the recording date and time of the moving image file. In this case, the fact that the association has been made can be determined by comparing the management ID of the moving image file that has been read out with the management ID recorded in each information block.

Furthermore, according to the association method that uses the metadata management table, it is not necessary to store a metadata file using a file name stored in the camera device 100 because the determination as to whether the file names of the stored moving image file and the metadata file are the same is not made.

According to the present embodiment, an image file and a supplementary information file obtained from a first external apparatus can be transmitted to a second external apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
a memory storing instructions which, when the instructions are executed by the one or more processors, cause the communication apparatus to function as:
an obtainment unit that obtains, from a first external apparatus, an image file and a supplementary information file related to the image file; and
a control unit that transmits, to a second external apparatus, (1) the image file that has been read by an image management application to which the image files are storable but the supplementary information files are not storable, and (2) the supplementary information file that has been read out by a file transfer application to which the supplementary information files associated with the image files stored by the image management application are storable,
wherein when the obtainment unit obtains the image file from the first external apparatus, the control unit requests list information of files stored in the first external apparatus, and receives the image file and the supplementary information file selected from the list information received from the first external apparatus.

2. The communication apparatus according to claim 1, wherein the control unit determines whether the supplementary information file corresponding to the image file received from the first external apparatus exists, wherein in a case where the supplementary information file corresponding to the image file received from the first external apparatus exists, the control unit obtains information that is used to associate the image file with the supplementary information file, from the image file, and wherein in a case where the image file is stored inte in the image management application, the control unit stores the supplementary information file in the file transfer application in association with the image file by using the information.

3. The communication apparatus according to claim 2, wherein in a case where the image file stored in the image management application is transmitted to the second external apparatus, the control unit (1) obtains the information from the image file that has been read out by the image management application, (2) reads out the supplementary information file associated with the image file by the file transfer application based on the information, and (3) transmits the image file and the supplementary information file to the second external apparatus.

4. The communication apparatus according to claim 3, wherein the control unit (1) determines whether the supplementary information file associated with the image file exists based on the information, and (2) reads out the supplementary information file from the file transfer application in a case where the supplementary information file associated with the image file exists.

5. The communication apparatus according to claim 1, wherein the file transfer application associates the image file with the supplementary information file by rewriting at least one of (1) a creation date and time and (2) an update date and time, described in a region of a directory of the supplementary information file to a recording date and time of the image file.

6. The communication apparatus according to claim 1, wherein the image management application unit sets a directory name of a directory of the supplementary information file to a recording date and time of the image file.

7. The communication apparatus according to claim 1, a file name of the image file, a recording date and time of the image file, and a storage location of the supplementary information file are recorded in a management table that associates the image file stored in the image management application with the supplementary information file stored in the file transfer application.

8. The communication apparatus according to claim 1, wherein the first external apparatus is an image capture apparatus that captures an image and that generates the image file, wherein the second external apparatus is a server that manages the image file, wherein the image file is a moving image file, and wherein the supplementary information file is a metadata file related to the moving image file.

9. A control method for a communication apparatus, the control method comprising:

obtaining, from a first external apparatus, an image file and a supplementary information file related to the image file; and controlling to transmit, to a second external apparatus, (1) the image file that has been read out from the first area by an image management application to which the image files are storable but the supplementary information files are not storable, and (2) the supplementary information file that has been read out by a file transfer application to which the supplementary information files associated with the image files stored by the image management application are storable, wherein when the obtaining obtains the image file from the first external apparatus, the controlling requests list information of files stored in the first external apparatus, and receives the image file and the supplementary information file selected from the list information received from the first external apparatus.

10. A non-transitory computer-readable storage medium storing a program for causing a computer to execute a control method for a communication apparatus, the control method comprising:

obtaining, from a first external apparatus, an image file and a supplementary information file related to the image file; and controlling to transmit, to a second external apparatus, (1) the image file that has been read by an image management application to which the image files are storable but the supplementary information files are not storable, and (2) the supplementary information file that has been read out by a file transfer application to which the supplementary information files associated with the image files stored by the image management application are storable, wherein when the obtaining obtains the image file from the first external apparatus, the controlling requests list information of files stored in the first external apparatus, and receives the image file and the supplementary information file selected from the list information received from the first external apparatus.

11. The apparatus according to claim 1, wherein in a case where a file management application to which both the image file and the supplementary information file are storable is designated as a storage destination for files obtained by the obtainment unit, the control unit stores the image file and the supplementary information file in the file management application that is different from the image management application and the file transfer application.

* * * * *